United States Patent [19]

Bougard

[11] Patent Number: 4,725,288
[45] Date of Patent: Feb. 16, 1988

[54] SOLID PARTICLES AND FLUID REACTOR

[76] Inventor: Jacques L. Bougard, Le Beaulieu 44, 6140 Fontaine-L'Evêque, Belgium

[21] Appl. No.: 821,854

[22] Filed: Jan. 23, 1986

[30] Foreign Application Priority Data

Feb. 5, 1985 [BE] Belgium ............................... 214454

[51] Int. Cl.$^4$ .............................. C10J 3/68; C10J 3/76
[52] U.S. Cl. ........................................... 48/76; 48/206;
422/203; 422/233; 110/245; 110/257; 110/281;
110/292; 122/4 D; 165/104.16
[58] Field of Search ............................ 48/66, 76, 206;
34/57 A, 164; 110/245, 257, 281, 292; 122/4 D;
431/7, 117 D; 165/104.16; 422/145, 203, 209, 233

[56] References Cited

U.S. PATENT DOCUMENTS

| 3,618,227 | 11/1971 | Breakell et al. ................ 34/164 |
| 3,867,110 | 2/1975 | Schora et al. .................. 48/206 |
| 3,982,901 | 9/1976 | Steever et al. ................. 34/57 A |
| 4,052,173 | 10/1977 | Schulz ............................ 48/206 |
| 4,071,332 | 1/1978 | Hafke et al. .................... 48/206 |
| 4,184,456 | 1/1980 | Taylor et al. .................. 110/245 |
| 4,226,830 | 10/1980 | Davis .............................. 110/245 |
| 4,544,020 | 10/1985 | Chrysostome et al. .......... 34/57 A |

FOREIGN PATENT DOCUMENTS

| 2445367 | 7/1980 | France . | |
| 52717 | 3/1982 | Japan ............................... 110/245 |
| 24710 | 2/1983 | Japan ............................... 34/57 A |
| 176619 | 1/1985 | Japan ............................... 110/245 |
| 2039458 | 8/1980 | United Kingdom . | |
| 264227 | 6/1970 | U.S.S.R. .......................... 34/164 |
| 517769 | 8/1976 | U.S.S.R. .......................... 34/164 |
| 775559 | 11/1980 | U.S.S.R. .......................... 34/164 |

Primary Examiner—David L. Lacey
Attorney, Agent, or Firm—Laff, Whitesel, Conte & Saret

[57] ABSTRACT

A system for reacting solid particles flowing under gravity through a thin walled enclosure has at least one fluid flowing through the enclosure in a counter-current to the flow of the solid particles. The feeding of the solid particles into the enclosure and the discharging therefrom of the converted ash particles may be adjusted. A particle bed is controlled by feeding the fluid into the enclosure so that it has to go through a substantial part of the bed thickness. The enclosure is vibrated to obtain a vibrated particle bed, with the vibrations being directed along a direction which lies at substantially a right angle to the vertical.

12 Claims, 2 Drawing Figures

SOLID PARTICLES AND FLUID REACTOR

This invention relates to a method for obtaining a vibrated bed involving the reaction of solid particles flowing through an enclosure under gravity and at least one fluid flowing through the enclosure in counter-current, with respect to the solid particles, as well as to an equipment for the working of this method.

The main drawback of the conventional methods and reactors with fixed bed lies in the gaseous fluid entering, with difficulty between the interfaces of the solid particles, whatever be the shape thereof anyway. As a result, there is a varying of gas-solid relative speeds from one point to another. These speeds are, on an average rather slow, and cause bad heat and material exchange rates, which leads to bulky and costly equipments. Moreover the local particle agglomerations due to sticking or fusing to one another or on the walls, as well as the granulometry distribution differentials in the various stages, cause variations in the beds, preferential passageways for the gaseous fluid, and even solid charge packings which lead to a completely irregular and even impossible solid-gas reactions.

The main drawback of the methods and reactors with fluidized beds lies in the gaseous fluid speeds which must be retained within very narrow limits to obtain a turbulent homogeneous suspension which is a perfect mixture of the solid particles in the gaseous fluid, to avoid depositing the largest particles at the bed bottom, and to limit a carrying of the finest particles along to the bed top. With most solid particles, the adjustments are critical, the ranges for modulating the flow rates or the powers are not large enough, the head losses and consequently the gaseous fluid circulating powers are very substantial. Some solid particles are even impossible to fluidize, because the size or specific weight thereof are too small or too great, or else vary within wide proportions, the shapes thereof are too flat or too irregular, the water contents thereof are very high.

The object of this is to obviate these drawbacks and to provide a method for obtaining a vibrated bed involving the reaction of solid particles flowing through an enclosure under gravity with at least one fluid flowing through the said enclosure in counter-current to the solid particles.

For this purpose, according to the invention, the feeding of the solid particles to the enclosure as well as the discharging of the converted particles from said enclosure are adjusted to form inside the enclosure a particle bed. The feeding of the fluid to the enclosure is adjusted to go through at least a substantial part of of the bed thickness. The discharging of the converted fluid from the enclosure is controlled, and the enclosure is a vibrated particle bed. With vibrations directed along a direction which lies substantially at a right angle to the vertical.

In one embodiment of the invention, the bed thickness is substantially constant. The vibration frequency and/or amplitude is adjusted according to the nature of the solid particles.

In an advantageous embodiment of the invention, a use is made of combustible particles as well as of a combustive fluid. The particles are ignited inside the bed.

According to the invention, an inventive equipment comprises a closed enclosure arranged to be vibratable. The enclosure has an inlet for the solid particles and an outlet for the converted fluid, which inlet and outlet are arranged adjacent the enclosure top. An inlet for the fluid and an outlet for the converted particles lie adjacent the enclosure bottom. There are means for adjusting the feeding and discharging of the solid particles to form a particle bed inside the enclosure, and means to vibrate the enclosure along a direction at substantially a right angle to the vertical to obtain a vibrated bed.

In one embodiment of the invention, the equipment feeds the fluid to the enclosure, a fluid distributor being arranged adjacent to the enclosure bottom. The nozzles of the distributor are regularly distributed to spread the fluid inside the bed, the nozzles being advantageously directed toward the enclosure bottom.

In a particularly advantageous embodiment of the invention, the enclosure comprises in the lower part thereof, a closable opening which enables an igniting of the combustible particles.

In a particularly advantageous embodiment of the invention, the enclosure is twin-walled, the outer wall having two openings adjacent the enclosure ends, with a circulating second fluid between both enclosure walls. The second fluid is comprised of water when use is made of combustible particles and when the particles are ignited. The water is boiled by the particle combustion. The space lying between both enclosure walls and above the water level are connected by a manifold to the distributor for the first fluid, in such a way as to mix steam therewith.

In another embodiment of the invention, the enclosure comprises an inner tube network embedded in the particle bed and having an inlet and an outlet to let a second fluid flow in the network. A heated fluid raises the temperature of the solid particles. The inner tube network and enclosure are joined by rigid connecting means.

Besides these advantages, the equipment according to the invention generates high heat powers within a small volume, having heat efficiencies as computed relative to the lower heat efficiency of the fuel, generally higher than 85%. At the same time, the equipment insures purifying of the combustion products before discharging same in the atmosphere. The equipment is quite simple, cheap, extremely reliable and very sure to manufacture, to operate and to maintain.

The equipment according to the invention is also particularly advantageous for a complete or partial gasification of a solid fuel, for the complete or partical combustion of a solid fuel with the simultaneous production of hot fluids, such as hot water or steam for heating, drying, heat decomposition, reduction, firing and cooling of solid particles such as limestone, magnesium limestone or ores, for oxidizing and possibly desulfurizing roasting of concentrated ores from copper, cobalt, lead or zinc.

The equipment according to the invention has a further advantage relative to previous devices, to provide a relatively low heat inertia. Thus, there is a very short response times to load variations, as well as a wide modulation range for the heat powers, in practice from 2 to 100% of the nominal values. Besides these advantages, the inventive equipment further purifies the combustible gases which are being produced or the combustion products before using the same or discharging the same to the atmosphere. The purification results from adding to the solid fuel, substances which can fix noxious materials, such as sulfur and tars, for example, and for neutralising products, such as calcium magnesium, potassium or sodium carbonates. The equipment also absorbs products, such as re-cycled ash or chamotte particles.

Other details and features of the invention will stand out from the following description, given by way of non-limitative example and with reference to the accompanying drawings, in which.

In the various figures, the same reference numerals pertain to identical or similar elements.

Figure 1:
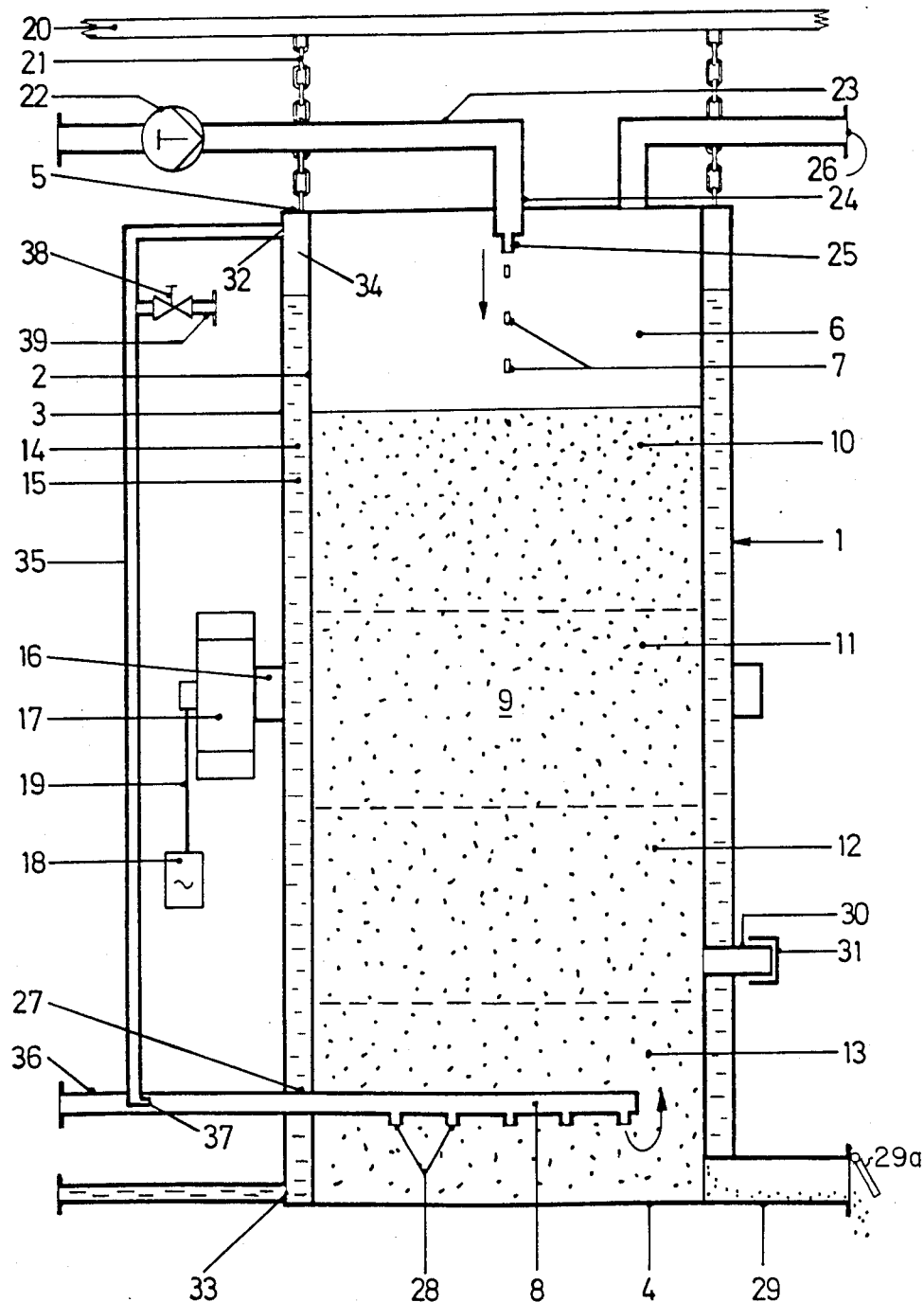
FIG. 1 is a diagrammatic view in elevation and cross-section, showing an embodiment of a solid-gas reactor with a vibrated bed according to the invention, for the gasification of solid fuels.

The solid-gas reactor with a vibrated bed according to the invention, as shown in figure 1, is intended for the gasification of high ash-content, poor quality solid fuels, such as the schists or tailings from coal washers. The invention comprises a closed enclosure 1 with twin walls 2, 3 arranged to be vibratable. The space bounded by inner wall 2, top 5 and bottom 4 of the enclosure comprises a primary space 6 where direct heat and material exchanges occur between the solid particles 7 in a downward flow, and a primary gaseous fluid 8, that is a steam and oxygen-based combustive agent in an upward flow.

A particle bed 9 is formed inside primary space 6, that is the space bounded by inner wall 2 of enclosure 1, the bottom 4 and top 5 thereof. The particle bed 9 is divided into four zones with substantially equivalent thicknesses, namely the zone 10 corresponding to a drying zone for the solid fuel, zone 11 corresponding to a distilling of the solid fuel zone, zone 12 corresponding to the fuel combustion zone, and zone 13 corresponding to the cooling of the ashes zone. The walls 2 and 3 of enclosure 1 comprise a secondary space 14 for enabling a second fluid 15 to circulate. The inner wall 2 enables an indirect heat exchange to occur between the solid particles 7 from bed 9 and the secondary fluid 15, which is generally comprised of water and which insures an efficient cooling of wall 2 while generating low-pressure steam. The main part of the enclosure is being used in the primary space 6 for fuel gasification and the excess steam is being recovered for outside uses, for example, a pre-heating of the fuel and combustive medium before feeding it inside the twin-walled enclosure 1.

A ring 16 is secured to the outer wall 3 of enclosure 1, substantially half-way between the ends thereof. A three-phase asynchronous electric motor 17, with casing, has unbalance means which is adjustable, either at rest or in operation, and is secured to ring 16. Motor 17 subjects the enclosure 1 to vibrations which are directed along a direction that is substantially at a right angle to the vertical, in order to obtain a vibrated bed. Motor 17 is mounted with the axis thereof lying vertically or substantially vertically, and is energized by a frequency changer 18 through a flexible cable 19, to enable a remote control of the frequency and the amplitude of those vibrations imparted to enclosure 1.

The means are arranged to subject the enclosure 1 to vibrations directed along a direction substantially at a right angle with respect to the vertical, to actually amplify the heat and material exchanges, to insure a smooth flow of the solid fuel particles 7 under gravity and in substantially horizontal layers, without back-flow or catching, to provide for homogeneizing the succeeding horizontal layers, and to automatically and remotely regulate the flow rate or residence time of solid fuel particles inside enclosure 1.

The enclosure 1 hangs from a structure 20, through chains 21, preferably four in number, hooked to the enclosure top 5, to limit the amplitude of those vibrations which are being conveyed to the structure to the values required by local building code regulations.

The enclosure 1 has the upper part thereof, which is a piston pump 22, a flexible line 23 and a vertical head 24, which is fitted with an extruding nozzle 25 for injecting a putty-like solid fuel in the shape of coils which shear as they come out into the enclosure in response to the action of the horizontal vibrations, to form particles 7. The various components control the feeding of solid particles 7 to enclosure 1, as well as a flexible line 26 for discharging the resulting combustible gas.

The enclosure 1 has, adjacent the bottom 4 thereof, a gaseous primary fluid distributor 27, that delivers the oxygen and steam-based combustive medium. The nozzles of distributor 27 are regularly distributed thereon to spread the primary fluid 8 inside bed 9, these nozzles are directed toward the bottom 4 of the enclosure 1. Distributor 27 is actually located in the area of the resulting ashes 13, that is within the first thickness quarter of bed 9, starting from enclosure bottom 4. The enclosure 1 also has at the bottom 4 a gravity-discharge line 29 for removal of the resulting ashes, and possibly with a damper 29a for regulating the solid fuel particle output, so as to form together with those means for regulating the particle feeding, as defined above, the particles bed 9 inside the enclosure. The inner pressure in the enclosure, at the level of line 29, is equal to the atmospheric pressure, so as to avoid any leak or air input. The enclosure 1 furthers comprises in the lower part thereof, and more particularly in the second quarter 12 of the bed thickness, that is in solid fuel combustion zone 12, a closable opening 30 which enables an igniting of the combustible particles. The opening being provided with a screwed plug 31.

Igniting the gas-generator occurs in a conventional way by means of a wood layer and a blow-pipe.

The enclosure outer wall 3 has two openings 32, 33 adjacent to the enclosure ends, for allowing a circulating of the secondary fluid 15 between both enclosure walls 2, 3. When the combustible particles 7 are ignited, the secondary fluid 15, comprised of water, is boiled by the particle combustion in order to generate steam. That space 34 laying between both enclosure walls 2, 3 and above the water level, is connected by a pipe 35 to the distributor 27 for the first fluid. The connection being in a way which mixes the resulting steam with the combustion air. The pipe 35 opens inside the feed line 36 of the distributor 27, the end of pipe 35 being co-axial with line 36 and the outlet 37 therefrom facing the enclosure 1. A valve 38 is provided in pipe 35 to direct part of the steam which will be used for other purposes, toward another steam-outlet pipe 39. In view of the above-described structure, the feeding of the solid combustible particles 7 to the enclosure 1 as well as the discharge therefrom of the converted particles or ashes are controlled to comprise the bed of particles 9. The feeding of combustive fluid 8 to the enclosure is adjusted to have the fluid go through a substantial part of the thickness of bed 9, the bed thickness being retained substantially constant. The particles are ignited inside the bed. The output of the resulting generated combustible fluid from the enclosure is controlled. The enclosure produces a vibrated particle bed, to direct vibrations along a direction lying substantially at a right angle to the vertical. The adjustment of the frequency and/or the amplitude of the vibrations depends on the nature of the solid particles 7.

Actually, the continuous vibrations generate fast alternating translation movements between the solid particles proper, between the particles and the gaseous primary fluid, and between the solid particles and the enclosure walls. There is a fast jerky rotation movement of the solid particles about themselves and relative to the gaseous primary fluid, and a slow rotation and spreading movements of the solid particle body in planes lying substantially at right angles to the vertical and about the enclosure vertical axis. There is a slow translation movement of the solid particle body due to gravity, the movement being from inlet means 25 toward the outlet means 29 of enclosure 1.

The heat and material exchange rates between the solid particles and the gaseous primary fluid on the one hand, and between the solid particles and the secondary fluid through inner enclosure wall 2 on the other hand, are markedly higher than the rates in reactors with fixed beds and are substantially equal to the rates in reactors with fluidized beds.

According to the invention, a use may be made of particles from solid fuels with very high, medium or low heating values, such as anthracites, lean coals, rich coals, flaming coals, lignites, peats, wood, straws, cokes, schists and tailings from coal washing plants, concentrated ores for copper, cobalt, lead and zinc. The solid particles originate as a plastic paste, such as for example coal tailings with 20-25% water or clay and pulverized coal mixtures being particularly suitable for this purpose. Such solid fuel particles are gasified in the presence of the gaseous primary fluid, generally comprised as stated above, of oxygen and steam, to obtain at the outlet, on the other hand, a combustible gas on the basis of carbon monoxide and hydrogen, which is easy to purify. These particles have a production cost which is substantially lower than the cost of natural gas. The combustible gas may be used for directly heating generators for hot water, steam and hot gases, in ovens for cooking, melting and treating, in incinerators and driers. On the other hand, ash particles of fuels with very low heating value, may have retained the initial shape of the fuel particles while becoming porous and strong. This ash may lead to very paying uses, for example, the ash may remain in the shape of absorbers or chamotte, instead of being discharged to waste.

The solid fuels with an ash proportion between 2 and 90%, with a water proportion between 1 and 25%, and a sulfur proportion between 0 and 5%, are fed to the vibrated bed as particles, the mean size of which normally lies between 4 and 40 mm. The ratio of the largest dimension to the smallest dimension is lower than or equal to 2. The particles are actually obtained by screening with a possible crushing, by previous agglomerating of plastic pastes or powders, with or without binder, by means of presses with balls or other round-shaped bodies, or finally by direct extruding of plastic pastes with or without a binder. Extensions occurs inside the enclosure, by means of a piston or screw pump, a flexible line and a vertical nozzle. The extruded fuel may be in the shape of strips which shear directly at the outlet under the action of the horizontal vibrations, in order to form cylpebs.

As already stated hereinbefore, the secondary fluid is preferably water to allow an efficient cooling of the walls of enclosure 1, while generating low-pressure steam. The major portion of the steam is used in the center part of primary space 6 of the enclosure for fuel gasification. The excess may be recovered for outside uses, for example, by pre-heating the fuel and combustive medium before feeding it to the enclosure.

The temperatures inside the combustion zone of a vibrated-bed reactor are always lower than the clean melting temperature of the ash. These temperatures may be adjusted easily and very accurately by varying the oxygen/steam ratio in the gaseous primary fluid which is being injected.

By increasing the oxygen/steam ratio, the bed temperature is raised as the reaction of oxygen with carbon, so-called "air gas", is exothermal. By lowering such ratio, the bed temperature is reduced as the reaction of the steam with carbon, so-called "water gas", is endothermal.

Such accuracy in controlling the bed temperature in the combustion zone insures a very regular cooking of the ashes, by avoiding the uncooked and overcooked ones, by avoiding the insufficient sintering, and the surface fusing which causes porous and strong products.

Figure 2:
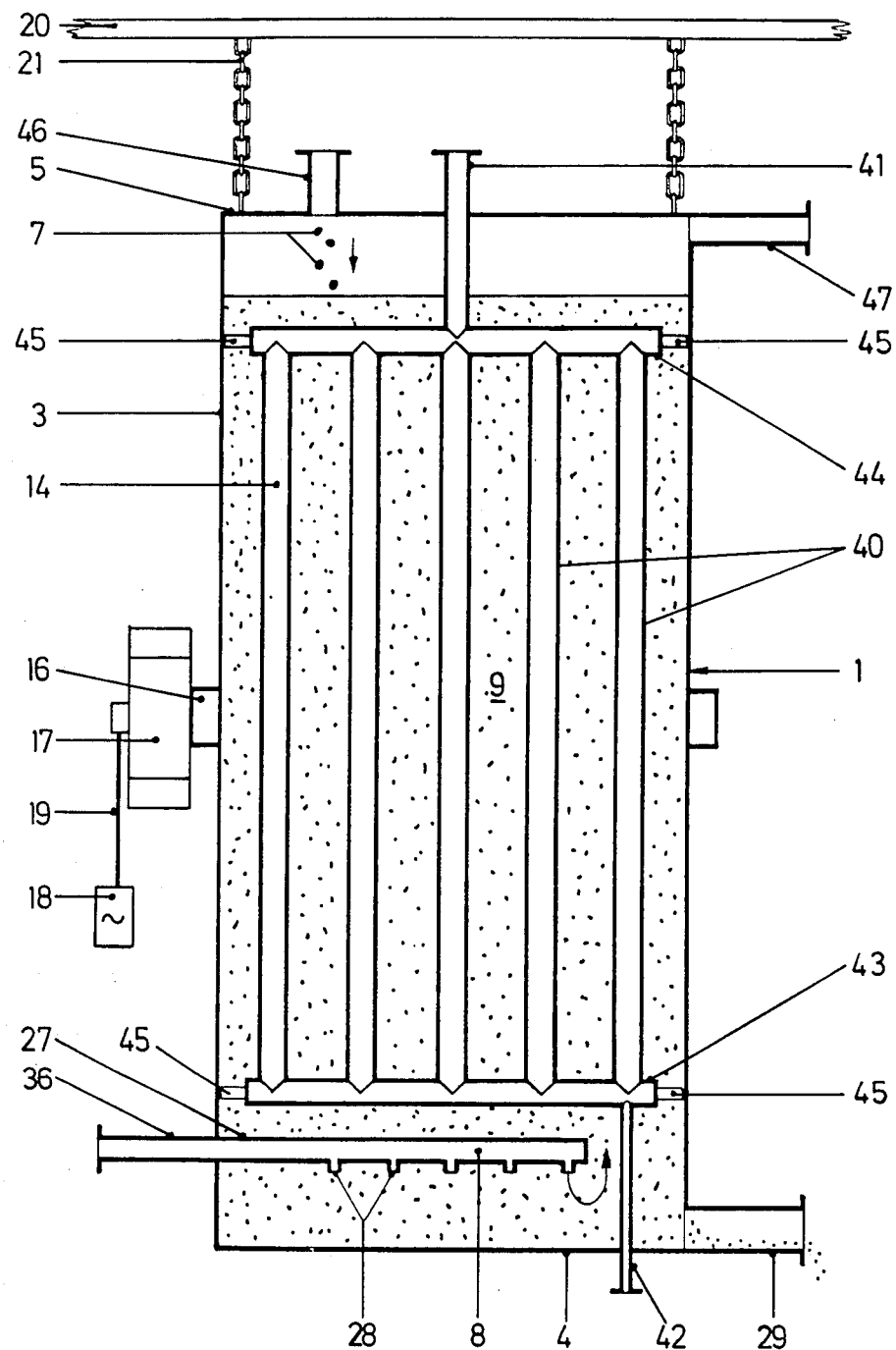
FIG. 2 is a diagrammatic view in elevation and cross-section, showing a variation of the equipment as shown in FIG. 1, and more particularly intended for drying solid particles.

The vibrated-bed solid-gas reactor, according to the invention as shown in FIG. 2, is a variation of the reactor as shown in FIG. 1. The FIG. 2 reactor is more particularly intended for drying solid particles, such as coal, limestone or sand, in an enclosure 1, direct heat and material exchanges occur between solid particles 7 in a downward flow and a gaseous primary fluid 8, for example air, in an upward flow. Enclosure 1 has a network of inner tubes 40, 43, 44 embedded in the particle bed 9. These tubes are provided with an inlet line 41 and an outlet line 42 to let a heated secondary fluid 14 circulate in the network, so as to raise the temperature of the solid particles 7 in bed 9. the flexible line 41 is used to discharge condensed water from the inner tube network 40, 43, 44.

The inner tube network is formed by a series of vertical tubes 40, a lower tube-like manifold 43, and an upper tube-like manifold 44. The tube-like manifolds 43 and 44 connect the tubes 40 together. The vertical tubes 40, which are smooth or have outer surfaces enlarged by fins or studs, are regularly distributed inside enclosure 1. Rigid connecting means 45 are provided to connect the inner tube network 40, 43, 44 to enclosure 1. Indirectly, heat exchanges between the secondary fluid 14 lying inside the inner tube set 40, 43, 44, which secondary fluid is formed by pressurized steam which condenses by yielding heat, and the solid particles from bed 9 inside enclosure 1. The heat drys the particles. The enclosure 1, as in FIG. 1, is also fitted with an outer ring 16 bearing an electric motor 17 with an unbalanced means, that is energized from frequency changer 18 through a flexible cable 19.

The enclosure 1 also hangs from a fixed structure 20 through chains 21. The enclosure 1 has, at the top thereof with a flexible line 47 for discharging the vapors, air plus steam.

The enclosure 1 is arranged as in the previous case, in the lower part thereof, with a flexible line 36 for feeding pressurized air and with a distributor 27 with nozzles 28, which are regularly distributed thereon inside the bed 9 of dried particles, as well as with a line 29 for discharging the dried solid particles under gravity.

Besides the above cited advantages, it will further be noted that the devices according to the invention have the advantage relative to previous devices, not to include any inner mechanical member, such as reducing gears, loaders, spreaders, stirring arms, grates or rotating bed-plates. There are no components working under high temperature, such as fire-brick linings or skirtings from fire-proof steel. Thus, there are not parts undergoing a fast wear or damage, which results in lower maintenance costs.

It must be understood that the invention is in no way limited to the above embodiments and that many changes may be brought therein without departing from the scope of the invention as defined by the appended claims.

For instance, all of the inlet and outlet lines for materials from enclosure 1 are flexible, that is they will preferably be fitted with rubber or metal equalizers, designed to withstand the axial, sidewise and angular displacements, as well as to absorb the vibrations between the fixed parts and the movable parts.

I claim:

1. Equipment for practicing a process for gasification and reacting together solid particles flowing through an enclosure under gravity and at least one fluid flowing through said enclosure in a rising counter-current with respect to movement of the solid particles, said equipment comprising: an enclosure, means for mounting said enclosure so as to be vibrated, said enclosure having both an inlet and an outlet at both the top and the bottom thereof, said top inlet being for admitting solid particles, said top outlet being for discharging converted fluid, said bottom inlet being for admitting a first fluid, and said bottom outlet being for discharging converted particles, means for adjusting the admitting and discharging of the solid particles to form a particle bed inside the enclosure, and means for vibrating said enclosure in a direction wherein said vibrations are directed substantially at right angle to the vertical in order to obtain a vibrated bed.

2. The equipment as defined in claim 1, which further comprises means coupled to said bottom inlet for feeding the fluid into the enclosure, a fluid distributor means inside said enclosure and coupled to said bottom inlet and arranged adjacent the enclosure bottom, a plurality of nozzles coupled to said distributor means and regularly distributed to spread the fluid inside said enclosure, said nozzles being directed toward the enclosure bottom.

3. The equipment as defined in claim 2, in which the enclosure has a lower part which comprises a closable opening having a closure means which enables an ignition of solid particles in the enclosure.

4. The equipment as defined in claim 3, in which said fluid distributor means is located in a lower portion of said enclosure, said closable ignition opening lying above said distribution means.

5. The equipment as defined in claim 1, in which the enclosure is twin-walled, an outer of said twin walls having two openings adjacent the ends of said enclosure and means for circulation a second fluid between both of said enclosure walls.

6. The equipment as defined in claim 5, further including a distributor pipe connected to the first inlet for feeding the first fluid into the enclosure a pipe coupled to said enclosure and connecting to space lying between said twin enclosure walls and said distributor pipe for the first fluid for forming a steam circulation system, said pipe providing means for mixing steam with the first fluid.

7. The equipment as defined in claim 6, in which said pipe is connected to said distributor by a feeding line and said pipe has an open end which opens inside said feeding line leading to said distributor, the end of said pipe opening being co-axial with said line and facing the enclosure.

8. The equipment as defined in claim 7, further including another pipe in flow communication with said pipe and a valve coupled into said pipe to divert part of the steam which will be used for other purposes toward other pipe.

9. The equipment as defined in claim 1, in which the enclosure comprises an inner network of tubes positioned within said enclosure which are positioned to be embedded in a bed of the particles, said network of tubes having an inlet and an outlet to enable a second and heated fluid to circulate through said network in order to raise the solid particle temperature.

10. The equipment as defined in claim 9, in which the network of tubes and the enclosure are interconnected by rigid connecting means.

11. Equipment as defined in claim 1, in which said enclosure has opposite ends, said means for vibrating the enclosure are comprised of an outer ring secured to said enclosure substantially half-way between the ends thereof, and an unbalanced motor secured to said ring to generate said bed vibrations along said direction.

12. Equipment as defined in claim 1, wherein said means for mounting said enclosure includes chains hooked to the enclosure top.

* * * * *